United States Patent
Hwang et al.

(10) Patent No.: US 12,348,625 B2
(45) Date of Patent: Jul. 1, 2025

(54) SIGNAL TRANSMISSION APPARATUS, SIGNAL RECEPTION APPARATUS, SIGNAL TRANSMISSION METHOD, AND SIGNAL RECEPTION METHOD IN AUTOENCODER-BASED ENCRYPTION KEY GENERATION SYSTEM

(71) Applicant: Gwangju Institute of Science and Technology, Gwangju (KR)

(72) Inventors: Eui Seok Hwang, Gwangju (KR); Jun Ho Song, Gwangju (KR); Seung Nam Han, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 175 days.

(21) Appl. No.: 17/988,766

(22) Filed: Nov. 17, 2022

(65) Prior Publication Data
US 2023/0231706 A1    Jul. 20, 2023

(30) Foreign Application Priority Data

Jan. 18, 2022    (KR) .................. 10-2022-0007063

(51) Int. Cl.
    *H04L 9/08*       (2006.01)
(52) U.S. Cl.
    CPC .......... *H04L 9/0869* (2013.01); *H04L 9/0822* (2013.01)
(58) Field of Classification Search
    CPC .............. H04L 9/0869; H04L 9/0822
See application file for complete search history.

(56) References Cited

U.S. PATENT DOCUMENTS

| | | | |
|---|---|---|---|
| 9,124,580 B1* | 9/2015 | Sampigethaya | H04L 63/0435 |
| 2007/0180022 A1* | 8/2007 | Kimura | G06F 21/6209 |
| | | | 714/4.4 |
| 2012/0106737 A1* | 5/2012 | Ly | H04L 9/0875 |
| | | | 380/270 |
| 2012/0140922 A1* | 6/2012 | Annavajjala | H04L 9/0875 |
| | | | 380/44 |
| 2017/0338956 A1 | 11/2017 | Badawy et al. | |
| 2021/0091942 A1* | 3/2021 | Nguyen | H04L 9/0866 |

FOREIGN PATENT DOCUMENTS

| | | |
|---|---|---|
| KR | 10-1253370 B1 | 4/2013 |
| KR | 10-1446629 B1 | 10/2014 |
| KR | 10-1912443 B1 | 10/2018 |

OTHER PUBLICATIONS

Autoencoder, Naverblog, Sep. 11, 2021.

* cited by examiner

*Primary Examiner* — Viet D Vu
(74) *Attorney, Agent, or Firm* — Revolution IP, PLLC

(57) ABSTRACT

The present invention relates to an autoencoder-based encryption key generation technique, and more particularly, to a signal transmission apparatus, a signal reception apparatus, a signal transmission method, and a signal reception method in an autoencoder-based encryption key generation system, wherein an encryption key with enhanced security may be generated on the basis of an autoencoder.

3 Claims, 9 Drawing Sheets

| Hyper parameter | Value |
|---|---|
| Batch size | 50 |
| Epoch | 100 |
| Learning rate | 0.001 |
| Optimizer | SGD with Adam |

SIGNAL TRANSMISSION APPARATUS, SIGNAL RECEPTION APPARATUS, SIGNAL TRANSMISSION METHOD, AND SIGNAL RECEPTION METHOD IN AUTOENCODER-BASED ENCRYPTION KEY GENERATION SYSTEM

BACKGROUND OF THE INVENTION

Field of the Invention

The present invention relates to an autoencoder-based encryption key generation technique, and more particularly, to a signal transmission apparatus, a signal reception apparatus, a signal transmission method, and a signal reception method in an autoencoder-based encryption key generation system.

Background of the Related Art

Recently, various types of physical layer security techniques for secure wireless communication systems are developed and studied.

Generally, a wireless communication system distributes and manages encryption keys by directly sharing a private key physically or applying a physical layer security technique using a key distribution center (KDC) or a public key infrastructure (PKI).

The physical layer security technique using a public key infrastructure is characterized in that a transmitter and a receiver share the same encryption key. However, the physical layer security technique using a public key infrastructure has a problem in that it is difficult to guarantee security when computing ability of a malicious attacker is outstanding.

The background art of the present invention is disclosed in Korean Patent Registration No. 10-1912443.

SUMMARY OF THE INVENTION

Therefore, the present invention has been made in view of the above problems, and it is an object of the present invention to provide a signal transmission apparatus, a signal reception apparatus, a signal transmission method, and a signal reception method in an autoencoder-based encryption key generation system capable of generating an encryption key with enhanced security on the basis of an autoencoder.

The technical problems to be solved by the present invention are not limited to the technical problems mentioned above, and unmentioned other technical problems can be clearly understood by those skilled in the art from the following description.

To accomplish the above object, according to one aspect of the present invention, there is provided a signal transmission apparatus in an autoencoder-based encryption key generation system.

The signal transmission apparatus in an autoencoder-based encryption key generation system according to an embodiment of the present invention may include: a seed key generation unit for generating a seed value of an autoencoder by quantizing the estimated channel state information (CSI) in a communication network; an encryption key generation unit for generating an encryption key using the autoencoder based on the generated seed value; and a transmission unit configured as an encoder to compress a message signal of the generated encryption key, convert the message signal into an encrypted signal, and transmit the encrypted signal to a signal reception apparatus.

According to another aspect of the present invention, there is provided a signal transmission method in an autoencoder-based encryption key generation system.

The signal transmission method in an autoencoder-based encryption key generation system according to an embodiment of the present invention may include the steps of: generating a seed value of an autoencoder by quantizing the estimated CSI in a communication network; generating an encryption key using the autoencoder based on the generated seed value; and compressing a message signal of the generated encryption key, converting the message signal into an encrypted signal, and transmitting the encrypted signal to a signal reception apparatus.

DETAILED DESCRIPTION OF THE PREFERRED EMBODIMENT

Figure 1:
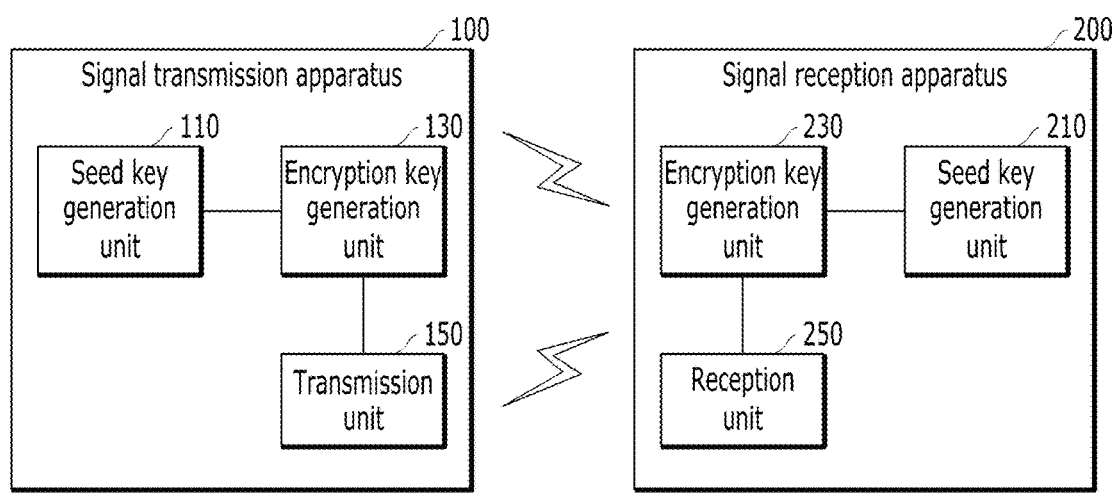
FIGS. 1 to 7 are views for explaining a signal transmission apparatus and a signal reception apparatus in an autoencoder-based encryption key generation system according to an embodiment of the present invention.

Hereinafter, the present invention will be described with reference to the accompanying drawings. However, the present invention may be implemented in several different forms, and thus is not limited to the embodiments described herein. In addition, in order to clearly explain the present invention in the drawings, parts unrelated to the description are omitted, and similar reference numerals are attached to similar parts throughout the specification.

Throughout the specification, when a part is "linked (connected, contacted, coupled)" to another part, it includes the cases of being "indirectly connected" with intervention of another member therebetween, as well as the cases of being "directly connected". In addition, when a part "includes" a certain component, this means that other components may be further provided, rather than excluding other components, unless clearly stated otherwise.

The terms used in this specification are used only to describe specific embodiments, and are not intended to limit the present invention. Singular expressions include plural expressions unless the context clearly dictates otherwise. It should be understood that in this specification, terms such as "comprise" or "have" are intended to specify existence of a feature, number, step, operation, component, part, or a combination thereof described in the specification, not to preclude the possibility of existence or addition of one or more other features, numbers, steps, operations, components, parts, or combinations thereof.

FIGS. 1 to 7 are views for explaining a signal transmission apparatus and a signal reception apparatus in an autoencoder-based encryption key generation system according to an embodiment of the present invention.

Referring to FIG. 1, an autoencoder-based encryption key generation system includes a signal transmission apparatus 100 for transmitting an encrypted signal, and a signal reception apparatus 200 for receiving the encrypted signal.

The signal transmission apparatus 100 and the signal reception apparatus 200 extract features (latent variables) of a wireless CSI on the basis of an autoencoder, respectively, and transmit and receive the same physical layer encryption key by generating a weight and a bias, which are encryption keys, using a seed value as an input.

The signal transmission apparatus 100 includes a seed key generation unit 110, an encryption key generation unit 130, and a transmission unit 150.

The seed key generation unit 110 extracts features from the estimated CSI in a communication network, and generates a seed value of the autoencoder by quantizing the extracted features. The configuration of the seed key generation unit 110 will be described below in detail.

The encryption key generation unit 130 generates an encryption key using the autoencoder based on the generated seed value.

The transmission unit 150 is configured as an encoder to compress and convert a message signal of the generated encryption key into an encrypted signal. The transmission unit 150 transmits the encrypted signal to the signal reception apparatus 200.

The signal reception apparatus 200 includes a seed key generation unit 210, an encryption key generation unit 230, and a reception unit 250.

The seed key generation unit 210 extracts features from the estimated CSI in a communication network, and generates a seed value of the autoencoder by quantizing the extracted features.

The encryption key generation unit 230 generates an encryption key using the generated seed value.

The reception unit 250 is configured as a decoder to restore the encrypted signal received from the signal transmission apparatus 100 into an original message signal.

Figure 2:
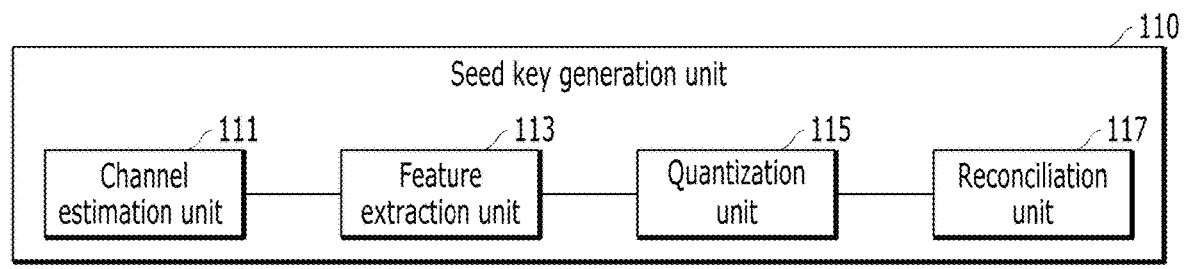

Referring to FIG. 2, the seed key generation unit 110 includes a channel estimation unit 111, a feature extraction unit 113, a quantization unit 115, and a reconciliation unit 117. Here, since description of the seed key generation units 110 and 210 and the encryption key generation units 130 and 230 of the signal transmission apparatus 100 and the signal reception apparatus 200 are the same, only the configuration of the signal transmission apparatus 100 will be described.

The channel estimation unit 111 estimates channel information of at least one among a channel gain and a channel phase from the CSI.

The feature extraction unit 113 extracts a feature value (latent variable) from he estimated channel information using the autoencoder.

Here, the autoencoder is an unsupervised neural network used for extracting features of a channel, and is configured of a transmitter for compressing input data and a receiver for restoring the compressed data in the form of the input data.

Figure 3:
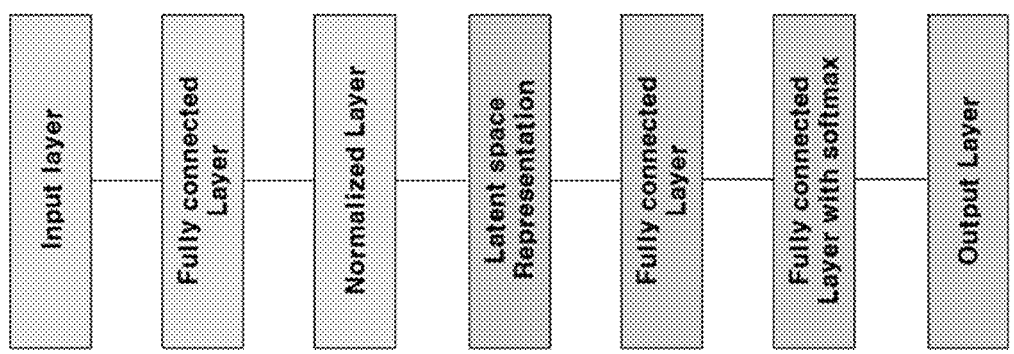

Referring to FIG. 3, the autoencoder includes a transmitter (input layer, connected Layer, and normalized Layer), a channel (latent space representation), and a receiver (fully connected layer, fully connected layer with softmax, and output layer). At this point, the batch size of the autoencoder may be 50, the epoch may be 100, the learning rate may be 0.001, and the optimizer may be Adam, which is a transform function of Stochastic Gradient Descent (SGD).

Figure 4:
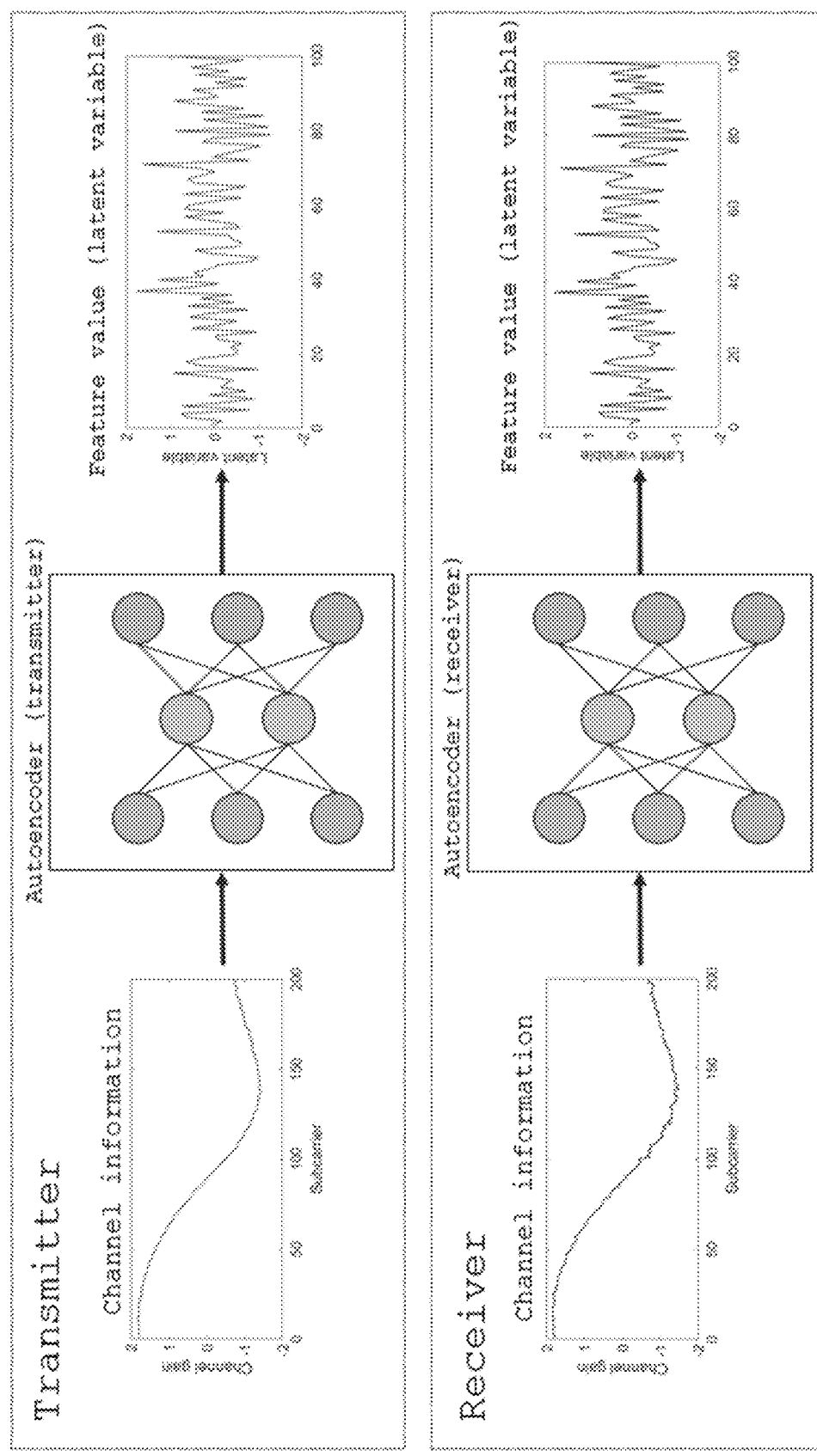

In the feature extraction unit 113 of the signal transmission apparatus 100 and the feature extraction unit 113 of the signal reception apparatus 200, the autoencoder extracts feature values of channel information using the estimated channel information as an input as shown in FIG. 4.

Figure 5:
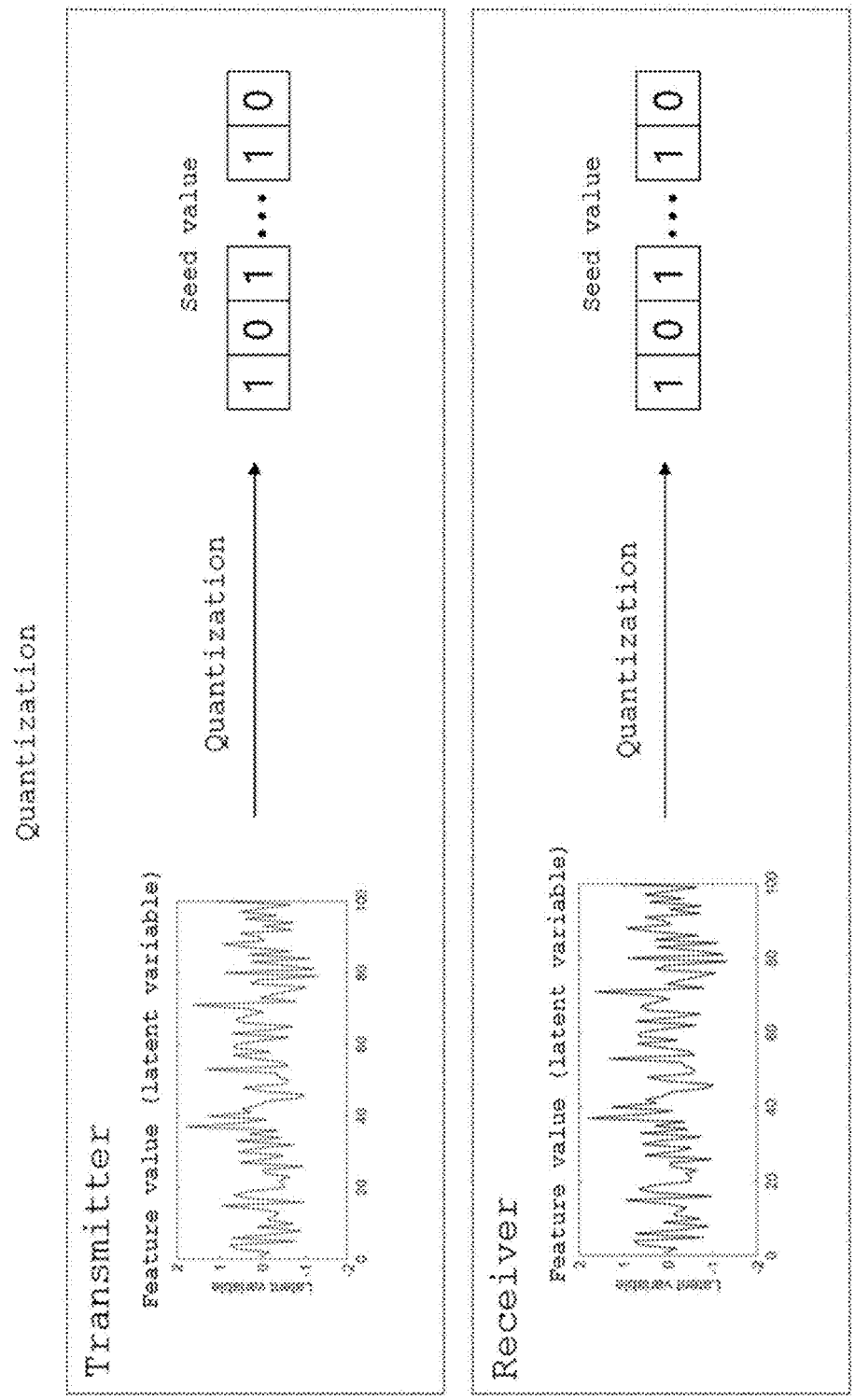

Referring to FIG. 5, the quantization unit 115 generates a seed key value by binarizing the feature value of channel information by performing quantization on the extracted feature value of the channel information.

Referring to FIG. 2 again, the reconciliation unit 117 reconciles the seed key value generated through quantization. Here, the reconciliation unit 117 removes error values in order to maintain the seed key value generated between the transmitter and the receiver to be the same.

Figure 6:
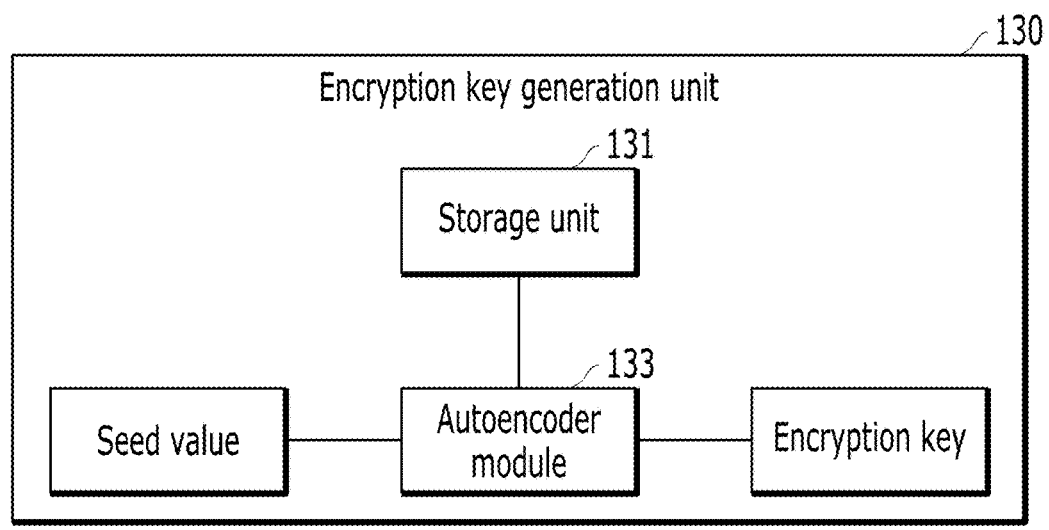
Figure 7:
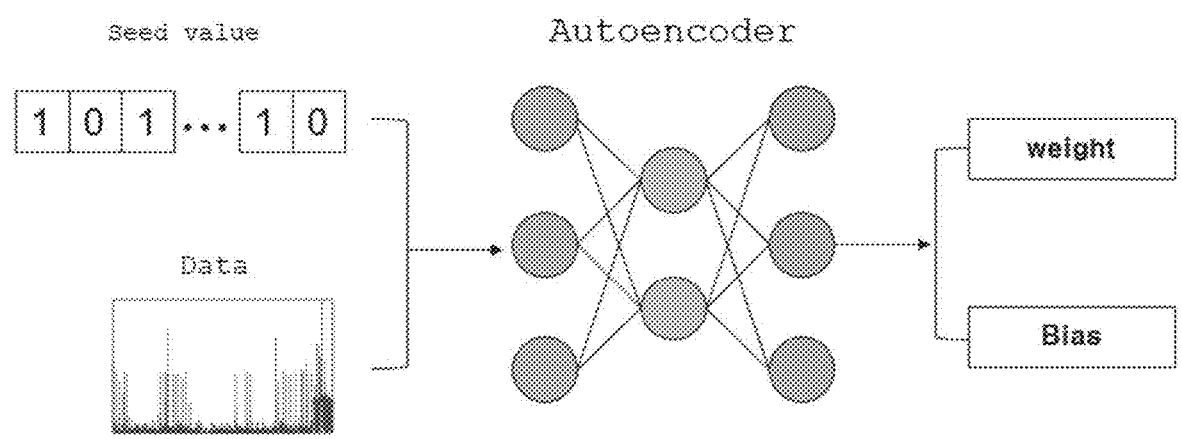

Referring to FIGS. 6 and 7, the encryption key generation unit 130 generates a weight and a bias, which are encryption keys, by performing privacy amplification that inputs the generated seed value into the autoencoder. At this point, the encryption key generation unit 130 may include a storage unit for storing training data, and generate an encryption key using the autoencoder learned through the training data stored in the storage unit.

Figure 8:
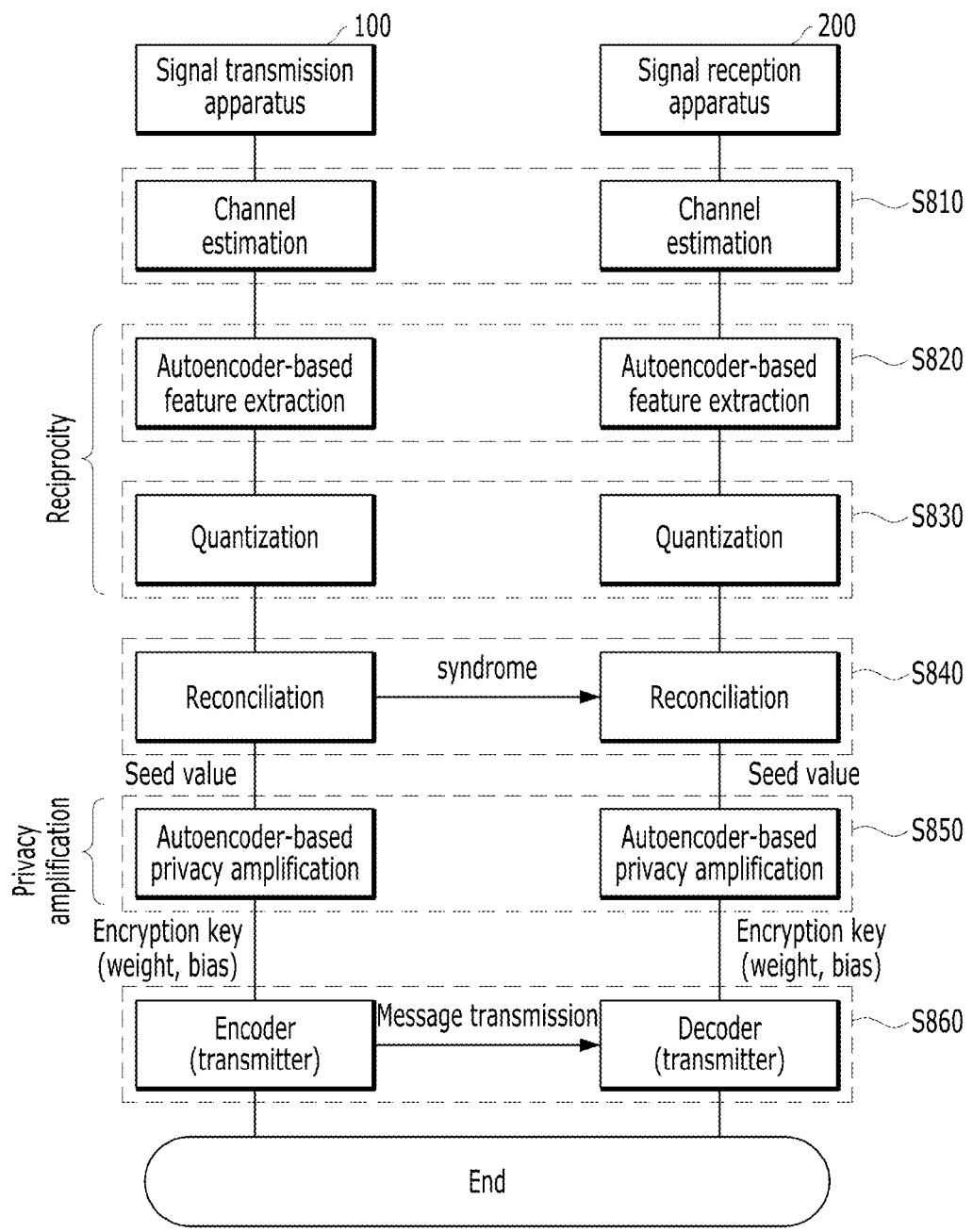
FIG. 8 is a view for explaining a signal transmission method and a signal reception method in an autoencoder-based encryption key generation system according to an embodiment of the present invention.

FIG. 8 is a view for explaining a signal transmission method and a signal reception method in an autoencoder-based encryption key generation system according to an embodiment of the present invention.

Referring to FIG. 8, at step S810, the signal transmission apparatus 100 and the signal reception apparatus 200 estimate channel information. At this point, the signal transmission apparatus 100 and the signal reception apparatus 200 estimate channel information of at least one among a channel gain and a channel phase.

At step S820, the signal transmission apparatus 100 and the signal reception apparatus 200 extract a feature value (latent variable) of the estimated channel information using the autoencoder.

At step S830, the signal transmission apparatus 100 and the signal reception apparatus 200 generate a seed key value by binarizing feature values of channel information by performing quantization on the extracted feature values of the CSI.

At step S840, the signal transmission apparatus 100 and the signal reception apparatus 200 reconcile the seed key value generated through quantization. The signal transmission apparatus 100 and the signal reception apparatus 200 remove error values in order to maintain the seed key value generated between the transmitter and the receiver to be the same.

At step S850, the signal transmission apparatus 100 and the signal reception apparatus 200 generate a weight and a bias, which are encryption keys, by performing privacy amplification that inputs the generated seed value into the autoencoder. At this point, the signal transmission apparatus 100 and the signal reception apparatus 200 may generate an encryption key using the autoencoder learned through the stored training data.

At step S860, the signal transmission apparatus 100 compresses and converts a message signal using an encryption key into an encrypted signal. The signal transmission apparatus 100 transmits the encrypted signal to the signal reception apparatus 200. In addition, the signal reception apparatus 200 receives the encrypted signal from the signal transmission apparatus 100 and restores the original message signal.

FIGS. 9 to 14 are views for explaining performance of a signal transmission apparatus and a signal reception apparatus in an autoencoder-based encryption key generation system according to an embodiment of the present invention.

Figure 9:
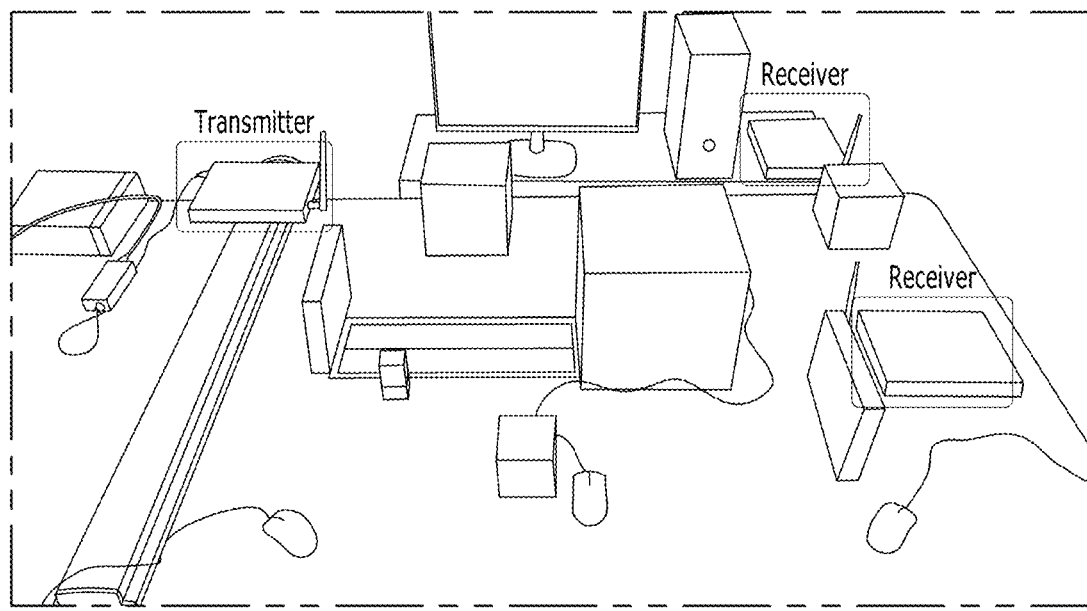
FIGS. 9 to 14 are views for explaining performance of a signal transmission apparatus and a signal reception apparatus in an autoencoder-based encryption key generation system according to an embodiment of the present invention.
Figure 10:
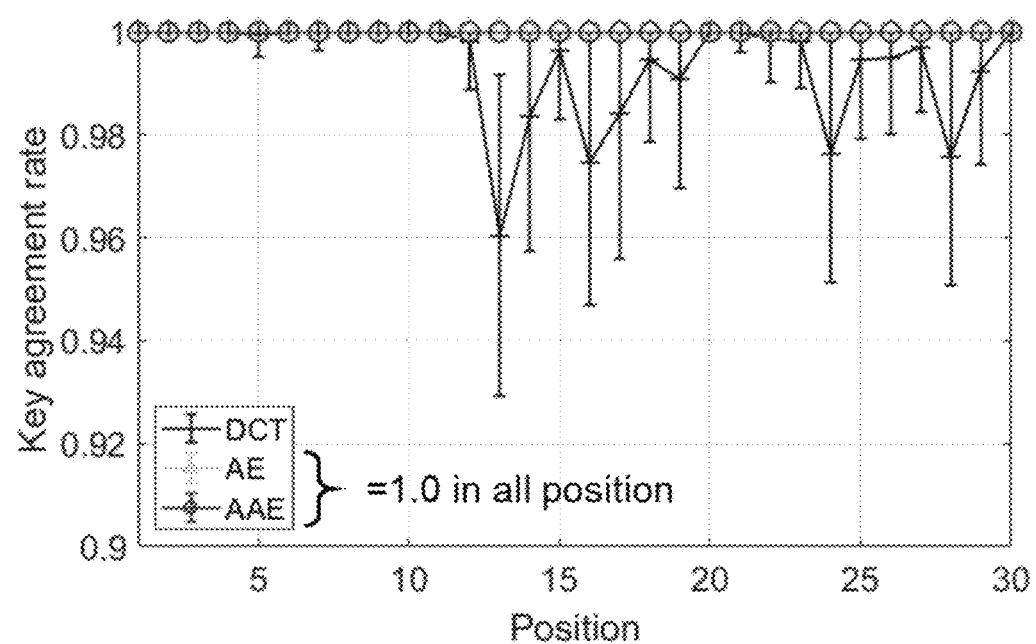

Referring to FIGS. 9 to 10, as a result of comparing feature extraction performance of a seed key generated through an existing feature extraction method (DCT) using channel gain information measured at thirty locations with that of a seed key generated through the autoencoder-based feature extraction method (AE, AAE) according to an embodiment of the present invention, it can be confirmed that the seed key generated by the autoencoder-based feature extraction method has a higher key agreement rate than the seed key generated by the existing feature extraction method. Therefore, it can be confirmed that the feature extraction performance of the signal transmission apparatus 100 and the signal reception apparatus 200 is excellent in the autoencoder-based encryption key generation system according to an embodiment of the present invention.

Figure 11:
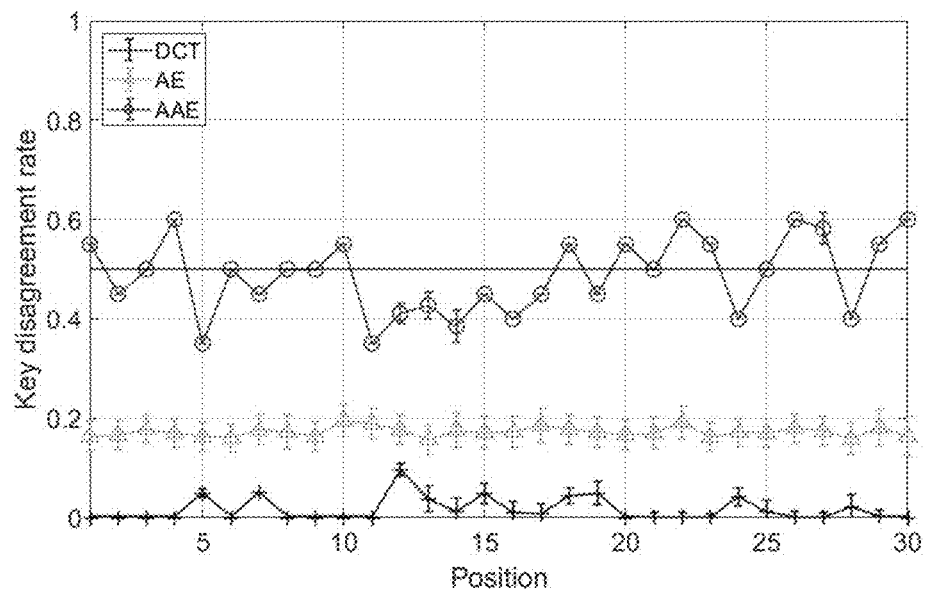
Figure 12:
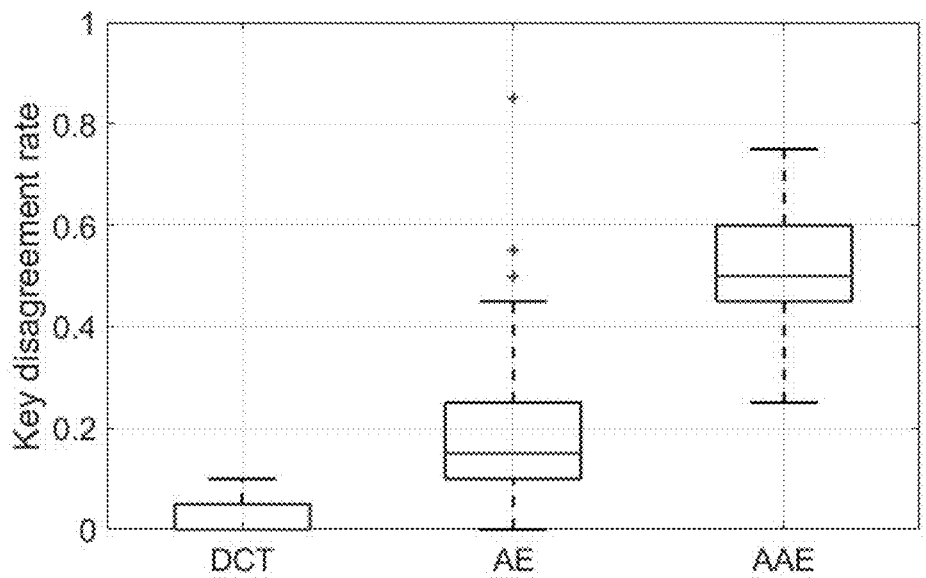

Referring to FIGS. 11 to 12, as a result of comparing security performance of a seed key generated through an existing feature extraction method (DCT) using channel gain information measured at thirty locations with that of a seed key generated through an autoencoder-based feature extraction method (AE, AAE) according to an embodiment of the present invention, it can be known that the seed key generated through the autoencoder-based feature extraction method has a key disagreement rate close to 0.5 compared to the seed key generated by the existing feature extraction method. Therefore, it can be confirmed that the seed key security performance of the signal transmission apparatus 100 and the signal reception apparatus 200 is excellent in the autoencoder-based encryption key generation system according to an embodiment of the present invention.

Figure 13:
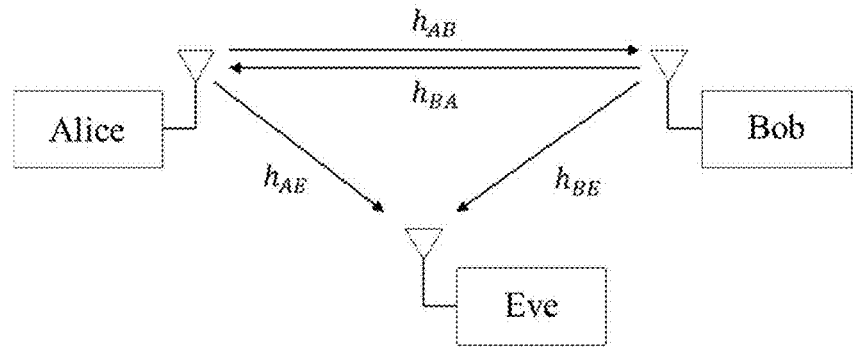
Figure 14:
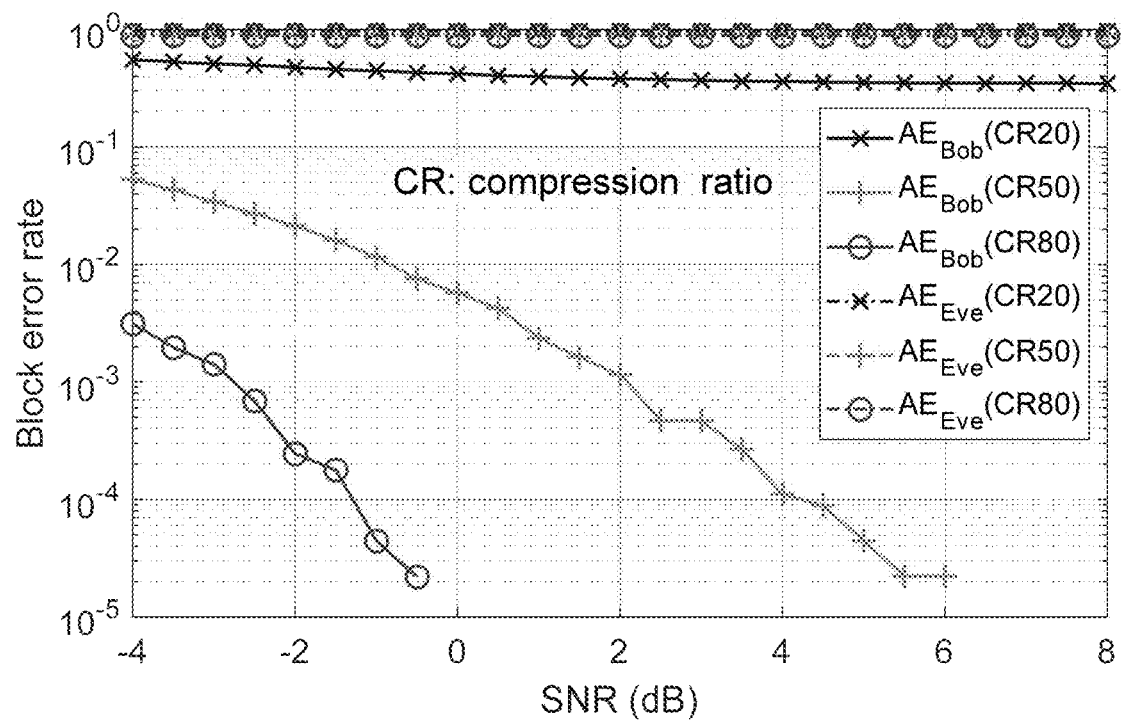

Referring to FIGS. 13 and 14, as a result of performing an attack scenario of generating a seed key by an attacker (Eve) on the autoencoder-based feature extraction method (AE, AAE) according to an embodiment of the present invention, it can be confirmed that the block error rate of the attacker (Eve) for the message signal is higher than that of the legitimate receiver (Bob) when an encryption key is generated according to the signal-to-noise ratio (SNR) and compression ratio (CR, compressed data size/raw data size in percentile) and applied to a communication system. Therefore, it can be confirmed that the encryption key security performance of the signal transmission apparatus 100 and the signal reception apparatus 200 is excellent in the autoencoder-based encryption key generation system according to an embodiment of the present invention.

According to an embodiment of the present invention, an encryption key with enhanced security may be generated on the basis of an autoencoder.

It should be understood that the effects of the present invention are not limited to the effects described above, and include all effects that can be inferred from the configuration of the present invention described in the detailed description or claims of the present invention.

The description of the present invention described above is for illustrative purposes, and those skilled in the art may understand that it can be easily modified into other specific forms without changing the technical spirit or essential features of the present invention. Therefore, it should be understood that the embodiments described above are illustrative in all respects and not restrictive. For example, each component described as a single type may be implemented in a distributed form, and components described as distributed may also be implemented in a combined form likewise.

The scope of the present invention is indicated by the following claims, and all changes or modifications derived from the meaning and scope of the claims and their equivalents should be construed as being included in the scope of the present invention.

What is claimed is:

1. A signal transmission apparatus in an autoencoder-based encryption key generation system, the apparatus comprising:
 a seed key generation unit for generating a consistent seed key value using an autoencoder by quantizing estimated Channel State Information (CSI) in a communication network, the seed key generation unit including:
 a channel estimation unit for estimating the CSI which includes at least one of a channel gain and a channel phase;
 a feature extraction unit for extracting a feature value which is a latent variable from the estimated CSI based on a neural network-based autoencoder;
 a quantization unit for generating the seed key value by binarizing the extracted feature value in a way of performing quantization on the extracted feature value from the CSI; and
 a reconciliation unit for performing reconciliation of removing error values from the generated seed key value;
 an encryption key generation unit for generating an encryption key using the generated seed key value and training data, the encryption key generation unit being configured to:
 trains an autocoder using the generated seed key value and training data;
 perform privacy amplification that inputs the generated seed key value into the autoencoder;
 generate a weight and a bias as the encryption key using the training of the autoencoder; and
 wherein the autoencoder includes a transmitter compressing input data and a receiver restoring the compressed input data to extract target data, and wherein the input data includes the CSI and the seed key value, and the target data includes the feature value, the weight, and the bias;
 wherein the autoencoder is configured to learn from training data to generate the encryption key, and
 wherein the transmitter and receiver operate integrally within the same neural network inside the autoencoder;
 wherein learning data is stored in a storage device within the encryption key generation unit or is operated dynamically without using the storage device; and
 a transmission unit configured as an encoder to compress a message signal and convert the message signal into an encrypted signal using the generated encryption key, and to transmit the encrypted signal to a signal reception apparatus.

2. A signal reception apparatus in an autoencoder-based encryption key generation system, the apparatus comprising:
 a seed key generation unit for generating a consistent seed key value using an autoencoder by quantizing estimated Channel State Information (CSI) in a communication network, the seed key generation unit including:
 a channel estimation unit for estimating the CSI which includes at least one of a channel gain and a channel phase;
 a feature extraction unit for extracting a feature value which is a latent variable from the estimated CSI based on a neural network-based autoencoder;

a quantization unit for generating the seed key value by binarizing the extracted feature value in a way of performing quantization on the extracted feature value from the CSI; and a reconciliation unit for performing reconciliation of removing error values from the generated seed key value;

an encryption key generation unit for generating an encryption key using the generated seed key value and training data, the encryption key generation unit being configured to:

trains an auto der using the generated seed key value and training data, perform privacy amplification that inputs the generated seed key value into the autoencoder;

generate a weight and a bias as the encryption key using the training of the autoencoder; and wherein the autoencoder includes a transmitter sing input data and a receiver restoring the compressed input data to extract target data, and wherein the input data includes the CSI and the seed key value, and the target data includes the feature value, the weight, and the bias;

wherein the autoencoder is configured to learn from training data to generate the encryption key; and wherein the transmitter and receiver integrally within the same neural network inside the autoencoder;

wherein learning data is stored in a storage device within the encryption key generation unit or is operated dynamically without using the storage device; and a reception unit configured as a decoder to restore an encrypted signal received from a signal transmission apparatus into an original message signal.

3. A signal transmission method in an autoencoder-based encryption key generation system, the method comprising the steps of:

generating a consistent seed key value using an autoencoder by quantizing estimated Channel State Information (CSI) in a communication network, the step of generating seed key value including the steps of:

estimating the CSI which includes at least one of a channel gain and a channel phase;

extracting a feature value which is a latent variable from the estimated CSI based on a neural network-based autoencoder;

generating the seed key value by binarizing the extracted feature value in a way of performing quantization on the extracted feature value from the CSI; and performing reconciliation of removing error values from the generated seed key value;

generating an encryption key using the generated seed key value and training data, the step of generating the encryption key including the steps of:

training an autoencoder using the generated seed key value and training data;

performing privacy amplification that inputs the generated seed key value into the autoencoder;

generating a weight and a bias as the encryption key using the training of the autoencoder; and wherein the autoencoder includes a transmitter compressing input data and a receiver restoring the compressed input data to extract target data, and wherein the input data includes the CSI and the seed key value, and the target data includes the feature value the weight, and the bias;

wherein the autoencoder is configured to learn from training data to generate the encryption key; and wherein the transmitter and receiver operate integrally within the same neural network inside the autoencoder;

wherein learning data is stored in a storage device within the encryption key generation unit or is operated dynamically without using the storage device; and compressing a message signal and converting the message signal into an encrypted signal using the generated encryption key, and transmitting the encrypted signal to a signal reception apparatus.

* * * * *